United States Patent
Zhang et al.

(10) Patent No.: US 10,997,778 B2
(45) Date of Patent: May 4, 2021

(54) METHOD FOR GENERATING THREE-DIMENSIONAL MODEL, AND TERMINAL DEVICE

(71) Applicant: Huawei Technologies Co., Ltd., Shenzhen (CN)

(72) Inventors: Xing Zhang, Shenzhen (CN); Kun Liu, Shanghai (CN); Jiangwei Li, Beijing (CN); Cheng Du, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 16/464,202

(22) PCT Filed: Feb. 23, 2017

(86) PCT No.: PCT/CN2017/074530
§ 371 (c)(1),
(2) Date: May 24, 2019

(87) PCT Pub. No.: WO2018/094883
PCT Pub. Date: May 31, 2018

(65) Prior Publication Data
US 2019/0371047 A1    Dec. 5, 2019

(30) Foreign Application Priority Data
Nov. 26, 2016    (CN) .......................... 201611057262.7

(51) Int. Cl.
*G06T 15/20* (2011.01)
*G06T 11/00* (2006.01)
*G06T 17/20* (2006.01)

(52) U.S. Cl.
CPC .......... *G06T 15/205* (2013.01); *G06T 11/003* (2013.01); *G06T 17/20* (2013.01); *G06T 2210/32* (2013.01)

(58) Field of Classification Search
None
See application file for complete search history.

(56) References Cited

U.S. PATENT DOCUMENTS 6,424,996 B1 *   7/2002   Killcommons ........ G16H 10/60
                                                               709/206
6,690,762 B1 *   2/2004   Berestov .............. G01N 23/046
                                                               378/4
(Continued)

FOREIGN PATENT DOCUMENTS

CN    101339018 A    1/2009
CN    102831635 A    12/2012
(Continued)

OTHER PUBLICATIONS

Machine Translation and Abstract of Chinese Publication No. CN103617220, Mar. 5, 2014, 20 pages.
(Continued)

*Primary Examiner* — Jeffrey J Chow
(74) *Attorney, Agent, or Firm* — Rimon PC

(57) ABSTRACT

A method, where one file includes file data of a plurality of files for generating a three-dimensional model includes obtaining a first file in a picture format, an extension data segment of the first file includes at least one first data segment, and the first data segment includes the file data of the files for generating a first three-dimensional model of the three-dimensional model, obtaining the file data of the files from the first data segment, and generating the first three-dimensional model based on the file data of the files.

14 Claims, 7 Drawing Sheets

(56) References Cited

U.S. PATENT DOCUMENTS

| | | | |
|---|---|---|---|
| 8,717,384 B1* | 5/2014 | Wirtz | G06F 7/00 345/629 |
| 2005/0110788 A1* | 5/2005 | Turner | G16H 30/20 345/419 |
| 2007/0005581 A1* | 1/2007 | Arrouye | G06F 7/00 |
| 2009/0021514 A1 | 1/2009 | Klusza | |
| 2012/0203806 A1* | 8/2012 | Panushev | G06Q 10/06 707/825 |
| 2015/0269315 A1* | 9/2015 | Arakita | A61B 5/0035 382/131 |
| 2015/0363962 A1* | 12/2015 | Schmidt | G06T 1/60 345/424 |
| 2016/0287345 A1* | 10/2016 | Penenberg | A61B 6/465 |
| 2019/0095418 A1* | 3/2019 | Gonzalez | B29C 64/386 |
| 2019/0117379 A1* | 4/2019 | Quiros | A61B 5/0062 |
| 2019/0279416 A1* | 9/2019 | Lee | G06T 15/005 |

FOREIGN PATENT DOCUMENTS

| | | |
|---|---|---|
| CN | 103617220 A | 3/2014 |
| CN | 103854304 A | 6/2014 |
| CN | 105160700 A | 12/2015 |
| CN | 105260441 A | 1/2016 |
| CN | 105809733 A | 7/2016 |
| KR | 20090025699 A | 3/2009 |

OTHER PUBLICATIONS

Machine Translation and Abstract of Chinese Publication No. CN105260441, Jan. 20, 2016, 8 pages.
Machine Translation and Abstract of Chinese Publication No. CN105809733, Jul. 27, 2016, 7 pages.
Machine Translation and Abstract of Chinese Publication No. CN103854304, Jun. 11, 2014, 12 pages.
Machine Translation and Abstract of Korean Publication No. KR20090025699, Mar. 11, 2009, 11 pages.
Machine Translation and Abstract of Chinese Publication No. CN101339018, Jan. 7, 2009, 13 pages.
Machine Translation and Abstract of Chinese Publication No. CN102831635, Dec. 19, 2012, 14 pages.
Machine Translation and Abstract of Chinese Publication No. CN105160700, Dec. 16, 2015, 13 pages.
Foreign Communication From a Counterpart Application, PCT Application No. PCT/CN2017/074530, English Translation of International Search Report dated Aug. 31, 2017, 2 pages.
Foreign Communication From a Counterpart Application, PCT Application No. PCT/CN2017/074530, English Translation of Written Opinion dated Aug. 31, 2017, 5 pages.

* cited by examiner

A_Q3_F_S_3002_Default.mtl
A_Q3_F_S_3002_Default.obj
I_Q3_F_Bd_0000_Co.png
I_Q3_F_S_3002_0_Co.png
I_Q3_F_S_3002_0_Nr.png
I_Q3_F_S_3002_0_Sp.png
I_Q3_F_S_3002_1_Co.png
I_Q3_F_S_3002_1_Nr.png
I_Q3_F_S_3002_2_Co.png
I_Q3_F_S_3002_2_Nr.png
I_Q3_F_S_3002_2_Sp.png

Obtain a first file in a picture format, where the first file includes a basic data segment and an extension data segment, the basic data segment includes two-dimensional image information of a three-dimensional model, the extension data segment includes at least one first data segment, and the first data segment includes file data of a plurality of files that are required for generating a first three-dimensional model of the three-dimensional model  ~ 210

Obtain the file data of the plurality of files from the first data segment  ~ 220

Generate the first three-dimensional model based on the file data of the plurality of files  ~ 230

FIG. 2

METHOD FOR GENERATING THREE-DIMENSIONAL MODEL, AND TERMINAL DEVICE

CROSS-REFERENCE TO RELATED APPLICATIONS

This application is a U.S. National Stage of International Application No. PCT/CN2017/074530 filed on Feb. 23, 2017, which claims priority to Chinese Patent Application No. 201611057262.7 filed on Nov. 26, 2016. Both of the aforementioned applications are hereby incorporated by reference in their entireties.

TECHNICAL FIELD

Embodiments of the present invention relate to the three-dimensional modeling field, and more specifically, to a method for generating a three-dimensional model, and a terminal device.

BACKGROUND

In the three-dimensional modeling field, a plurality of files in different formats are required for describing a three-dimensional model, and therefore there are a large quantity of files for the three-dimensional model, and it is inconvenient for a terminal device to manage the large quantity of files.

For example, a file of a three-dimensional model with a texture may include one OBJ file, one material library file (Material Library File, MTL file), and a plurality of JPG or PNG files. The OBJ file as a standard three-dimensional model file format is applicable to mutual transformation between most three-dimensional software models, and mainly supports polygon models. An MTL file describes material information of an object, and one MTL file may include definitions of one or more materials. For each material, all properties such as a color, a texture, and a reflection map are described. Therefore, generally, a large quantity of files are required for generating a three-dimensional model, and the large quantity of files are not in a uniform file format, so that it is inconvenient for the terminal device to manage the files. Once a file is missing, data of the three-dimensional model possibly cannot be correctly parsed.

SUMMARY

According to a method for generating a three-dimensional model and a terminal device provided in embodiments of the present invention, one file includes file data of a plurality of files that are required for generating a three-dimensional model. This avoids that the plurality of files are required for describing the three-dimensional model, ensures accuracy of parsed data information of the three-dimensional model, and facilitates management of the file including the three-dimensional model data information by the terminal device.

According to a first aspect, a method for generating a three-dimensional model is provided, including: obtaining a first file in a picture format, where an extension data segment of the first file includes at least one first data segment, and the first data segment includes file data of a plurality of files that are required for generating a first three-dimensional model of the three-dimensional model; obtaining the file data of the plurality of files from the first data segment; and generating the first three-dimensional model based on the file data of the plurality of files.

According to the method for generating the three-dimensional model provided in an embodiment of the present invention, one file includes the file data of the plurality of files that are required for generating the three-dimensional model. This avoids that the plurality of files are required for describing the three-dimensional model, ensures accuracy of parsed data information of the three-dimensional model, and facilitates management of the file including the three-dimensional model data information by the terminal device.

With reference to the first aspect, in a first possible implementation of the first aspect, the first file further includes a basic data segment, where the basic data segment includes two-dimensional image information of the three-dimensional model; and the method further includes: obtaining the two-dimensional image information from the basic data segment; and generating a thumbnail of the three-dimensional model based on the two-dimensional image information.

In this embodiment of the present invention, the terminal device may directly obtain, based on the two-dimensional image information included in the basic data segment of the first file, that model information of which type of three-dimensional model is stored in the first file, facilitating management of the first file by the terminal device.

With reference to the first aspect and the first implementation of the first aspect, in a second implementation of the first aspect, the extension data segment further includes a second data segment, and the second data segment includes an optional parameter for generating the three-dimensional model.

In this embodiment of the present invention, the generated three-dimensional model is more realistic by using the optional parameter of the second data segment.

With reference to the first aspect and the first implementation or the second implementation of the first aspect, in a third implementation of the first aspect, the first data segment includes a header field and a data field, where the header field is used for indicating a location of file data of each of the plurality of files at the first data segment.

In this embodiment of the present invention, the terminal device may quickly determine, by using the header field, the location of the file data of each of the plurality of files at the first data segment, so as to parse the file data accurately.

With reference to the first aspect and the first implementation to the third implementation of the first aspect, in a fourth implementation of the first aspect, the extension data segment further includes a third data segment, where the third data segment is used for indicating a source of the first file.

With reference to the first aspect and the first implementation to the fourth implementation of the first aspect, in a fifth implementation of the first aspect, a file format of the first file is a JPEG format, a PNG format, or another picture format.

According to a second aspect, a terminal device is provided, including one or more modules configured to implement the method of the first aspect.

According to a third aspect, a terminal device is provided, including a memory and a processor. The memory is configured to store program code, and the processor is configured to obtain a first file in a picture format. The first file includes a basic data segment and an extension data segment, the basic data segment includes two-dimensional image information of a three-dimensional model, and the extension data segment includes at least one first data segment. The first data segment includes file data of a plurality of files that are required for generating a first three-dimensional model of the three-dimensional model. The processor is further configured to obtain the file data of the plurality of files from the first data segment; and the processor is further configured to generate the first three-dimensional model based on the file data of the plurality of files.

With reference to the third aspect, in a first implementation of the third aspect, the processor is further configured to obtain the two-dimensional image information from the basic data segment; and the processor is further configured to generate a thumbnail of the three-dimensional model based on the two-dimensional image information.

With reference to the third aspect and the first implementation of the third aspect, in a second implementation of the third aspect, the extension data segment further includes at least one second data segment, the second data segment includes an optional parameter for generating the three-dimensional model, and the optional parameter is determined based on the three-dimensional model.

With reference to the third aspect and the first implementation and the second implementation of the third aspect, in a third implementation of the third aspect, the first data segment includes a header field and a data field, the header field is used for indicating a location of file data of each of the plurality of files at the first data segment, and the data field is used for storing the file data of the plurality of files that are required for generating the first three-dimensional model of the three-dimensional model.

With reference to the third aspect and the first implementation to the third implementation of the third aspect, in a fourth implementation of the third aspect, the extension data segment further includes at least one third data segment, and the third data segment is used for indicating a source of the first file.

With reference to the third aspect and the first implementation to the fourth implementation of the third aspect, in a fifth implementation of the third aspect, a file format of the first file is a JPEG format.

According to a fourth aspect, a computer readable storage medium is provided, and the computer readable storage medium is configured to store program code that can be executed by an apparatus that can troubleshoot a terminal device. The program code includes an instruction for implementing the method in the first aspect and the implementations of the first aspect.

BRIEF DESCRIPTION OF DRAWINGS

FIG. 1 is a schematic diagram of files that are required for generating a three-dimensional model with a texture according to an embodiment of the present invention;

FIG. 2 is a schematic flowchart of a method for generating a three-dimensional model according to an embodiment of the present invention:

DESCRIPTION OF EMBODIMENTS

Figure 3:
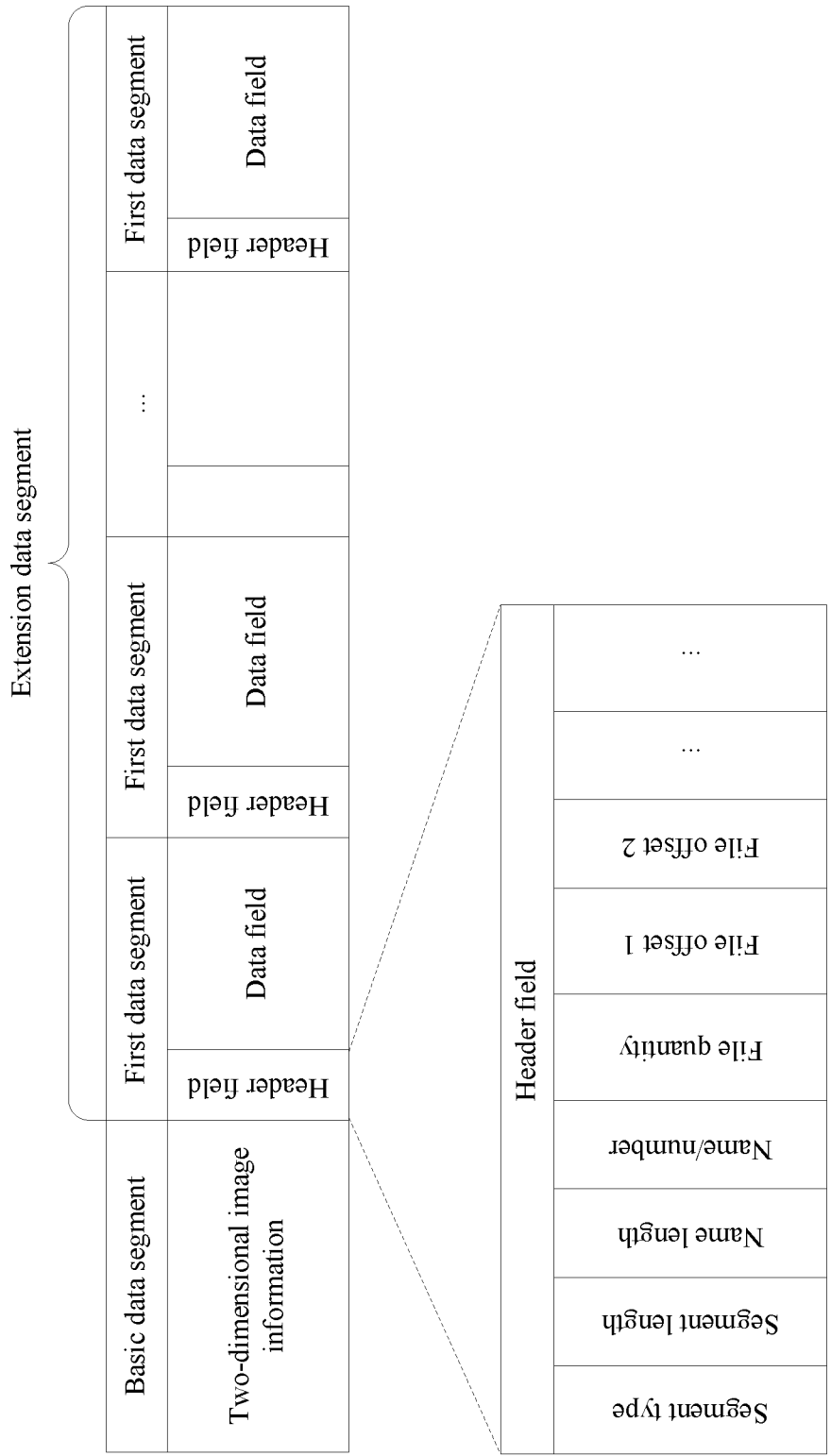
FIG. 3 is a schematic diagram of a first file in a picture format according to an embodiment of the present invention.

The following describes technical solutions in embodiments of the present invention with reference to accompanying drawings.

In the three-dimensional modeling field, there are many three-dimensional file formats, such as an STL file format, a PLY file format, an OBJ file format, a ZPR file format, an FXB file format, a VRML file format, and a 3DS file format. Table 1 describes the three-dimensional file formats.

TABLE 1

Three-dimensional file formats

| Three-dimensional file format | Introduction | Advantage | Disadvantage |
| --- | --- | --- | --- |
| STL | An STL file format is used for representing a triangular mesh in a computer graphic application system. The STL is a standard file type applied to a rapid prototyping system, and is a most common file format supported by a three-dimensional printer. | The file format is very simple and widely used. | Only geometrical information of a three-dimensional object is described, and information about a color, a texture, and the like are not supported. |
| VRML | A VRML file format is a structural data format similar to C language, and features good legibility. The VRML file format is a network virtual reality modeling language format that, independent of a computer platform, is generally used for interaction between a plurality of users on an Internet hyperlink and a web hyperlink. | Compared with the STL file format, the VRML file format has a stronger capability of expressing a three-dimensional model, and can support common attributes, such as a color, a texture, and a light. | It is difficult to extract program data. |

TABLE 1-continued

Three-dimensional file formats

| Three-dimensional file format | Introduction | Advantage | Disadvantage |
|---|---|---|---|
| PLY | A PLY-file format is a set of three-dimensional network model data format developed by Stanford University, and original models of a plurality of famous model data in the graphics field are based on this format. | With a simple structure, this format is widely applied, and is supported by almost all three-dimensional printers. | A picture insertion is not supported. |
| ZPR | ZBrush-specific | | Dedicated format |
| FBX | An FBX file format is produced by the Autodesk company, and is used for free three-dimensional creation and exchange across platforms. | | It is a dedicated format, and the file structure is not disclosed. |
| 3DS | A 3DS file format is a file format in 3D MAX, and is usually used when a File model is exported. | This format is not limited by a three-dimensional software version. | A picture insertion is not supported. |
| COLLADA (.dae) | A COLLADA file format is a digital asset exchange solution based on an Extensible Markup Language (Extensible Markup Language, XML), and oriented to an interactive three-dimensional application program, and enables a 3D creation application program to freely exchange the digital asset, without losing information. | Information about a skeleton, an animation, and the like may be included. | This format is not supported by most printers. |
| OBJ | An OBJ file format is a standard three-dimensional model file format developed by the Alias|Wavefront company for a set of workstation-based three-dimensional modeling and animation software "Advanced Visualizer". This file format is applicable to data exchange between three-dimensional software models, and mainly supports polygon models, excluding information about an animation, a material property, a map trail, dynamics, a particle, and the like. | Most three-dimensional computer aided design (Computer Aided Design, CAD) software supports the OBJ format, and most three-dimensional printers also support printing in the OBJ format. | A three-dimensional model with a texture includes OBJ + MTL + JPG files, and there are a large quantity of files. |
| 3mf | As a new file format issued in recent two years, a 3mf format is also referred to as a 3D manufacturing format (3D Manufacturing Format). It includes XML language for describing attribute information and surface information of one or more three-dimensional models. | More information about the three-dimensional model can be presented, file format conversion is supported, and the file format is extensible. | This format is totally new, and currently is not supported by most printers. |

As shown in Table 1, most three-dimensional file formats do not support a thumbnail, space extension, and the three-dimensional printer, and the like. In addition, a plurality of files are required for describing the three-dimensional model.

For example, FIG. 1 is a schematic diagram of files that are required for generating a three-dimensional model with a texture. As shown in FIG. 1, a material library file is required for generating the three-dimensional with the texture. The MTL file may include definitions of one or more materials, and for each material, a color, a texture, and a reflection map are further described. An OBJ file is also required, and the OBJ file is used for describing a geometrical feature of the three-dimensional model. Several PNG files are also required, and the PNG files include picture information of the reflection map that is required for generating the three-dimensional model. It can be learned that there are quite a lot of files for generating the three-dimensional model with the texture, and if any one of files is missing, data of the three-dimensional model possibly cannot be correctly parsed, that is, the three-dimensional model cannot be generated.

It should be understood that in this embodiment of the present invention, the quantity of files, shown in FIG. 1, for generating the three-dimensional model is merely used as an example to describe that a large quantity of files are required for generating the three-dimensional model in the prior art. However, an actual three-dimensional model may be more complex and finer, and correspondingly require more types and a larger quantity of model files.

An embodiment of the present invention provides the method for generating a three-dimensional model. In the method, the file in the picture format is used, and the file in the picture format includes the file data of the plurality of files that are required for generating the three-dimensional model. A terminal device may generate the three-dimensional model by using data information included in the file in the picture format. This avoids that the plurality of files are required for describing the three-dimensional model, ensures accuracy of parsed data information of the three-dimensional model, and facilitates management of the file including the three-dimensional model data information by the terminal device.

The following describes in detail the method with reference to FIG. 2.

FIG. 2 is a schematic flowchart of a method 200 for generating a three-dimensional model according to an embodiment of the present invention. The method 200 may be executed by a terminal device, and the terminal device 200, for example, may be a personal computer (Personal Computer, PC) product, a smart phone, and the like. This embodiment of the present invention is not limited thereto. As shown in FIG. 2, the method 200 includes the following steps.

210: Obtain a first file in a picture format, where an extension data segment of the first file includes at least one first data segment, and the first data segment includes file data of a plurality of files that are required for generating a first three-dimensional model of the three-dimensional model.

220: Obtain the file data of the plurality of files from the first data segment.

230: Generate the first three-dimensional model based on the file data of the plurality of files.

Specifically, the terminal device obtains the first file in the picture format, the extension data segment of the first file includes at least one first data segment, and the first data segment includes the file data of the plurality of files that are required for generating the first three-dimensional model of the three-dimensional model. After obtaining the first file, the terminal device may obtain the file data of the plurality of files from the first data segment of the first file, and generate the first three-dimensional model based on the file data of the plurality of files. The first three-dimensional model may be a part of the three-dimensional model, or may be the entire three-dimensional model.

In this embodiment of the present invention, one file includes the file data of the plurality of files that are required for generating the three-dimensional model. This avoids that the plurality of files are required for describing the three-dimensional model, ensures accuracy of parsed data information of the three-dimensional model, and facilitates management of the file including the three-dimensional model data information by the terminal device.

Optionally, in some embodiments, the first file further includes a basic data segment, and the basic data segment includes two-dimensional image information of the three-dimensional model. For example, the two-dimensional image information may be information about a front picture of the three-dimensional model, or information about a view picture that can best reflect a main characteristic of the three-dimensional model.

Optionally, in some embodiments, the terminal device may obtain the two-dimensional image information from the basic data segment, and generate a thumbnail of the three-dimensional model based on the two-dimensional image information. The thumbnail may be a thumbnail of the front picture of the three-dimensional model, or may be a thumbnail of the view picture that can best reflect the main characteristic of the three-dimensional model. Therefore, the terminal device may directly obtain, based on the thumbnail, that model information of which type of three-dimensional model is stored in the first file.

It should be understood that the first three-dimensional model may be the entire three-dimensional model, or may be a part of the three-dimensional model. When the first three-dimensional model is the entire three-dimensional model, the file data of the plurality of files is all data information that is required for generating the entire three-dimensional model. In this case, the first file may include only one first data segment, and the first data segment stores the file data of the plurality of files that are required for generating the entire three-dimensional model. When the first three-dimensional model is a part of the three-dimensional model, the file data of the plurality of files is all data information that is required for generating the part of the three-dimensional model. In this case, the first file includes a plurality of first data segments, and the plurality of first data segments separately store file data of a plurality of files that are required for generating each part of the three-dimensional model.

For example, the three-dimensional model is a human body three-dimensional model, and the first three-dimensional model may be an entire human body three-dimensional model. In this case, the first file may include only one first data segment, the first data segment includes the file data of the plurality of files that are required for generating the human body three-dimensional model, and the file data of the plurality of files is all model information that is required for generating the human body three-dimensional model. However, because the human body three-dimensional model is relatively complex, model information that is required for generating each part of the human body three-dimensional model may be stored in one first data segment. For example, model information of a human head part of the human body three-dimensional model may be stored in one first data segment, model information of a body part of the human body three-dimensional model may be stored in another first data segment, model information of a clothing part of the human body three-dimensional model may be stored in still another first data segment, and the like. Each first data segment includes file data of a plurality of files that are required for generating a corresponding part, and the file data of the plurality of files is all data information that is required for generating the corresponding part. In this case, the first file may include a plurality of first data segments.

Optionally, in some embodiments, the first data segment includes a header field and a data field, the header field is mainly used for indicating a location, at the first data segment, of file data of each of the plurality of files that are required for generating the first three-dimensional model, and the first three-dimensional model may be the entire three-dimensional model, or may be a part of the three-dimensional model.

Optionally, in some embodiments, the header field is further used for indicating a type of the first data segment.

For example, when the three-dimensional model is a human body three-dimensional model and the first data segment stores file data of a plurality of files that are required for generating a human head of the human body three-dimensional model, a type indicated by a header in the first data segment is a human head model. When the first data segment stores file data of a plurality of files that are required for generating a body of the human body three-dimensional model, a type indicated by a header in the first data segment is a body model, and the like.

Optionally, in some embodiments, the header field is further used for indicating a length of the first data segment.

Optionally, in some embodiments, the header field is further used for indicating a file name or number of each of the plurality of files.

Optionally, in some embodiments, the header field is further used for indicating a file name or number length of each of the plurality of files.

Optionally, in some embodiments, the header field is further used for indicating a quantity of the plurality of files.

For example, when the first data segment stores human head model information, file types of a plurality of files that are required for generating the human head model are separately an OBJ format, an MTL format, and a JPEG format. There are three files in the JPEG format, and in this case, a quantity of the plurality of files is six.

It should be understood that in this embodiment of the present invention, the OBJ format, the MTL format, the JPEG format, and the 3 files in the JPEG format are merely used as an example. This embodiment of the present invention is not limited thereto.

Optionally, in some embodiments, the data segment is used for storing the file data of the plurality of files that are required for generating the first three-dimensional model, and the first three-dimensional model may be the entire three-dimensional model, or may be a part of the three-dimensional model.

Optionally, in some embodiments, file formats of the plurality of files stored in the data segment may be an OBJ format, an MTL format, a JPG format, and the like.

It should be understood that in this embodiment of the present invention, the foregoing three file formats are merely used as an example to describe the file format of the plurality of files that are stored in the data segment. This embodiment of the present invention is not limited thereto.

It should be further understood that space occupied by the first data segment is determined by space occupied by the file data of the plurality of files that are required for generating three-dimensional model and that are stored in the first data segment, that is, space of the first data segment can dynamically change based on space occupied by the information that is stored in the first data segment.

Optionally, in some embodiments, the extension data segment further includes a second data segment, and the second data segment includes an optional parameter for generating the three-dimensional model.

For example, when the three-dimensional model is a human body three-dimensional model, the optional parameter may be a parameter, such as skeleton data, and the optional parameter may further be a parameter, such as an algorithm deformation parameter and configuration information. For example, the algorithm deformation parameter may be some parameters about an algorithm, or may be some parameters used in development by a third party. The configuration information may be configuration information required by the third party, a parameter required by the third party, or the like.

In this embodiment of the present invention, with the optional parameter that is included in the second data segment, the three-dimensional model may be better and may look more realistic visually.

In this embodiment of the present invention, the extension data segment of the first file may include only at least one first data segment, or may include at least one first data segment and at least one second data segment. According to design of the extension data segment, when a terminal device has a low configuration, the three-dimensional model can be generated based on only information in the first data segment without a need of obtaining information included in the second data segment. Compared with generation of a three-dimensional model based on information in both the first data segment and the second data segment, generation of this three-dimensional model is relatively simple, and this three-dimensional model has all characteristics that the original three-dimensional model should have, thereby analysis on the three-dimensional model is not affected. When a terminal device has a relatively high configuration, information included both in the first data segment and information included in the second data segment may be obtained, and a data analysis speed of the terminal device is not affected. In this case, the generated three-dimensional model is better and looks more realistic.

It should be understood that space occupied by the second data segment is determined by space occupied by the optional parameter that is stored in the second data segment, that is, space of the second data segment can dynamically change based on space occupied by the optional parameter that is stored in the second data segment.

Optionally, in some embodiments, the extension data segment further includes a third data segment, and the third data segment is used for indicating a file source of the first file.

Optionally, in some embodiments, the third data segment is further used for indicating a type of a first file. Whether the first file is a file including three-dimensional model information can be determined by a terminal device based on a type indication of the first file, to distinguish the first file from a general picture format file.

Optionally, in some embodiments, the third data segment is further used for indicating a quantity of the first data segments and a quantity of the second data segments that are included in the first file. Theoretically, a value range of the quantity may be 0 to 255.

Optionally, in some embodiments, the third data segment is further used for indicating a location of the first data segment or the second data segment at the first file, this is, the third data segment includes a segment offset of the first data segment and a segment offset of the second data segment.

Optionally, in some embodiments, a file format of the first file may be a JPEG format.

It should be understood that the first file may be a file in any picture format, may alternatively be, for example, a file in the PNG format. In this embodiment of the present invention, that the first file is in the JPEG format is merely used as an example, and this embodiment of the present invention is not limited thereto.

It should be understood that space of the extension data segment may be determined by the quantity of the first data segments and/or the quantity of the second data segments that are stored in the extension data segment, or may be determined by space occupied by information included in the first data segment and/or information included in the second data segment, that is, space of the extension data segment can dynamically change.

FIG. 3 is a schematic diagram of a first file in a picture format according to an embodiment of the present invention.

As shown in FIG. 3, a first file includes a basic data segment and at least one first data segment, the basic data segment includes two-dimensional image information of a three-dimensional model, and a terminal device can generate a thumbnail of the three-dimensional model based on the two-dimensional image information.

It should be understood that space of the basic data segment is determined by space occupied by the two-dimensional image information that is stored in the basic data segment.

As shown in FIG. 3, the first data segment includes the header field and the data field.

Optionally, in some embodiments, the header field includes a segment type field, and the segment type field is used for indicating a type of the first data segment. For example, when the three-dimensional model is a human body three-dimensional model, the type of the first data segment may be a human head model, may be a body model, or may be an entire human body three-dimensional model or a model of any part of the human body three-dimensional model. The segment type field may clearly indicate that model information of which part of the three-dimensional model is stored in the first data segment. A length of the segment type field is 1 byte.

Optionally, in some embodiments, the header field further includes a segment length field, the segment length field is used for indicating a length of the first data segment, and a length of a segment length field is 4 bytes.

Optionally, in some embodiments, the header field further includes a name length field, and the name length field is used for indicating a file name or number of each of the plurality of files that are required for generating the first three-dimensional model of the three-dimensional model. The first three-dimensional model may be the entire three-dimensional model, or may be a part of the three-dimensional model. A length of the name length field is 4 bytes.

Optionally, in some embodiments, the header field further includes a name or number field, the name or number field is used for indicating a name or number length of each of the plurality of files that are required for generating the first three-dimensional model of the three-dimensional model. The first three-dimensional model may be the entire three-dimensional model, or may be a part of the three-dimensional model. A length of the name or number field is 4 bytes.

Optionally, in some embodiments, the header field further includes a file quantity field, and the file quantity field is used for indicating a quantity of the plurality of files that are required for generating the first three-dimensional model of the three-dimensional model. The first three-dimensional model may be the entire three-dimensional model, or may be a part of the three-dimensional model. A length of the file quantity field is 1 byte.

Optionally, in some embodiments, the header field further includes a file offset field, the file offset field is used for indicating a location, at the first data segment, of each of the plurality of files that are required for generating the first three-dimensional model of the three-dimensional model, and the location of each file at the first data segment can be quickly determined based on the file offset field. The first three-dimensional model may be the entire three-dimensional model, or may be a part of the three-dimensional model. A length of the file offset field is 4 bytes.

It should be understood that a quantity of the file offset fields may be determined based on a quantity of files in the first data segment, that is, may be determined based on a value of the file quantity field.

The data segment is used for storing file data of a plurality of files that are required for generating the three-dimensional model or a part of the three-dimensional model. File types of the plurality of files may be, for example, the OBJ format, the MTL format, the JPG format, and the like.

It should be understood that in this embodiment of the present invention, the foregoing three file formats are merely used as an example to describe the file format of the plurality of files that are stored in the data segment. This embodiment of the present invention is not limited thereto.

A length of the data segment can be determined based on space occupied by data stored in the data segment, that is, can be determined based on file size of the plurality of files that is included in the data segment.

Figure 4:
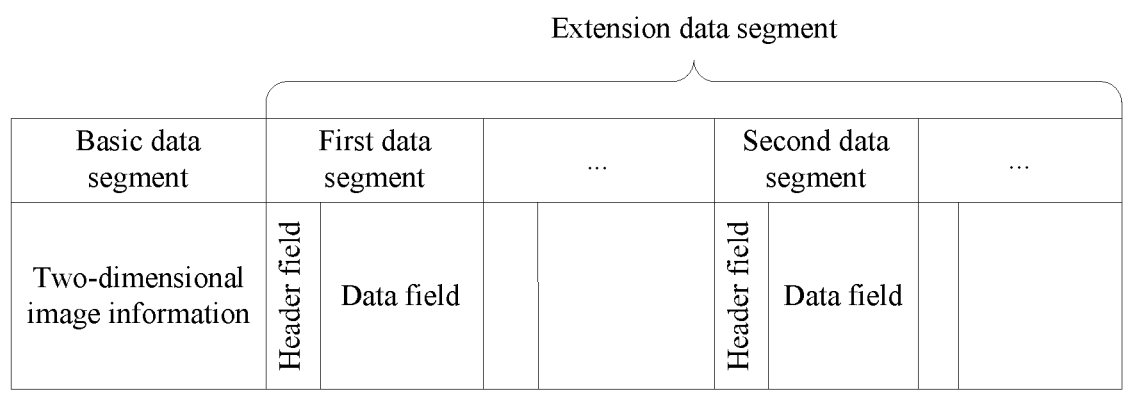
FIG. 4 is another schematic diagram of a first file in a picture format according to an embodiment of the present invention.

FIG. 4 is another schematic diagram of a first file in a picture format according to an embodiment of the present invention.

As shown in FIG. 4, the first file may include a basic data segment, at least one first data segment, and at least one second data segment. Information that is stored in the basic data segment and the first data segment is the same as information that is stored in the basic data segment and the first data segment, shown in FIG. 3, and details are not described herein again. The second data segment includes information about an optional parameter for generating a three-dimensional model.

For example, when the three-dimensional model is a human body three-dimensional model, the optional parameter may be a human body-related parameter, such as skeleton data, and the optional parameter may further be an algorithm deformation parameter, configuration information, and the like.

The second data segment also includes a header field and a data field, a field that is included in the header field of the second data segment is the same as a field that is included in the header field of the first data segment, and detailed are not described herein again.

Figure 5:
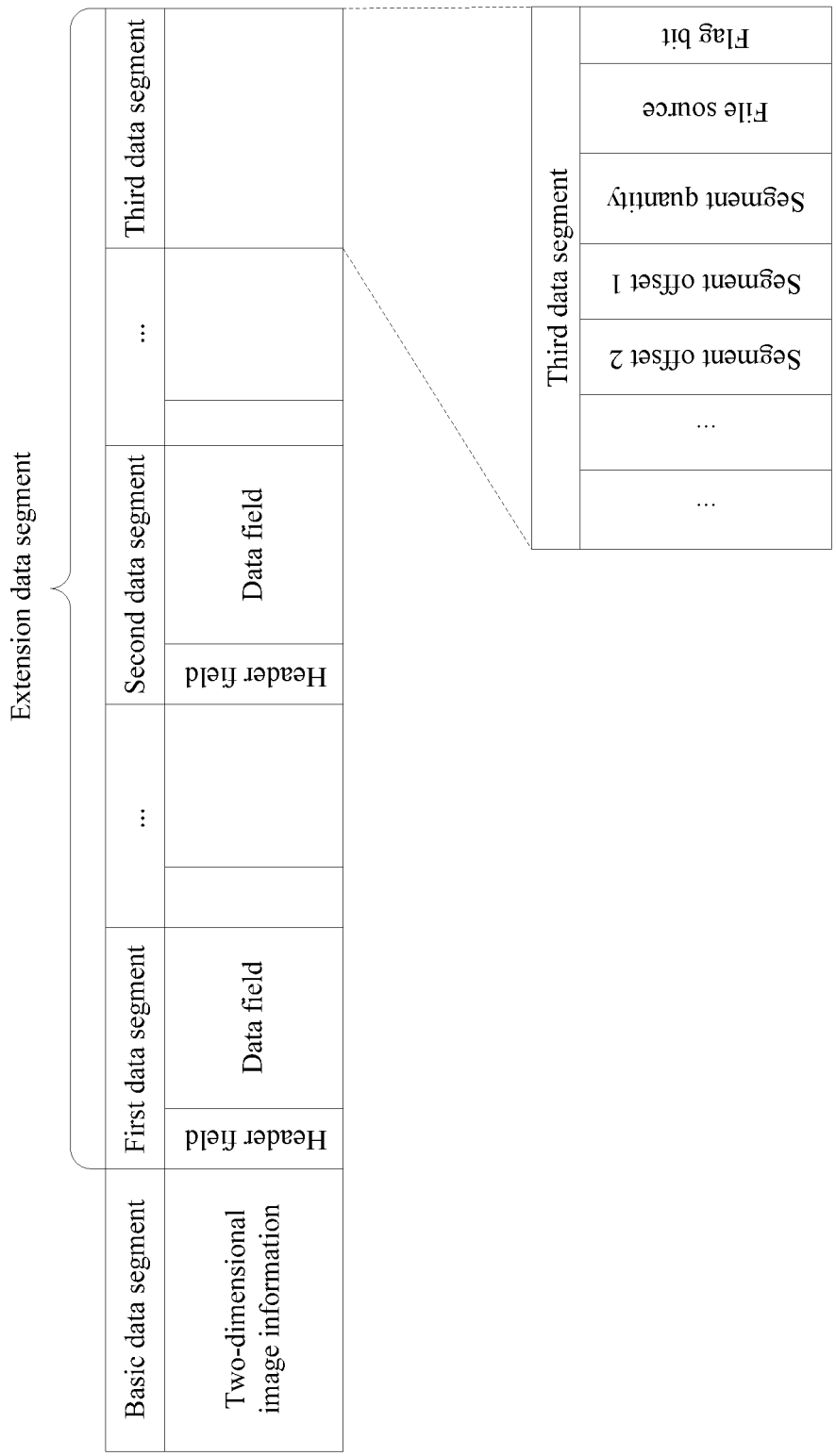
FIG. 5 is another schematic diagram of a first file in a picture format according to an embodiment of the present invention.

FIG. 5 is another schematic diagram of a first file in a picture format according to an embodiment of the present invention.

As shown in FIG. 5, the first file may include a basic data segment, at least one first data segment, at least one second data segment, and a third data segment. Information that is stored in the basic data segment, the first data segment and the second data segment is the same as information that is stored in the basic data segment, the first data segment and the second data segment, shown in FIG. 3 or FIG. 4, and details are not described herein again. The third data segment is mainly used for indicating a file source of the first file.

Optionally, in some embodiments, the third data segment includes a flag bit field, and the flag bit field is mainly used for indicating a type of the first file. Whether the first file is a file including data information of a three-dimensional model can be determined by a terminal device based on a type indication of the first file, to distinguish the first file from a general picture format file.

Optionally, in some embodiments, the third data segment further includes a file source field, and the file source field is used for indicating a file source of the first file.

Optionally, in some embodiments, the third data segment further includes a segment quantity field, the segment quantity field is used for indicating a quantity of the first data segments and a quantity of the second data segments in an extension data segment of the first file, and a total quantity of the first data segments and a total quantity of the second data segments in the extension data segment may be determined based on the segment quantity field.

Optionally, in some embodiments, the third data segment further includes a segment offset field, the segment offset field is used for indicating a location of each first data segment or each second data segment at the extension data segment, and the location of the first data segment or the second data segment may be quickly determined by using the segment offset field.

It should be understood that a quantity of the segment offset fields may be determined based on a total quantity of the first data segments and a total quantity of the second data segments in the extension data segment, that is, may be determined based on a value of the segment quantity field.

It should be understood that space of an extension data segment may be determined based on the quantity of the first data segments and the quantity of the second data segments in the extension data segment, or may be determined based on space occupied by information that is stored in the first data segments and/or the second data segments in the extension data segment. Space occupied by the first file, shown in FIG. 3, FIG. 4, and FIG. 5, is determined based on a size of the extension data segment of the first file.

It should be further understood that locations of the first data segment, the second data segment, and the third data segment, shown in FIG. 3, FIG. 4, and FIG. 5, can be randomly interchanged. In this embodiment of the present invention, that the first data segment is before the second data segment, and the third data segment is after the second data segment is merely used as an example to describe the data segment that is included in the extension data segment of the first file. This embodiment of the present invention is not limited thereto.

Figure 6:
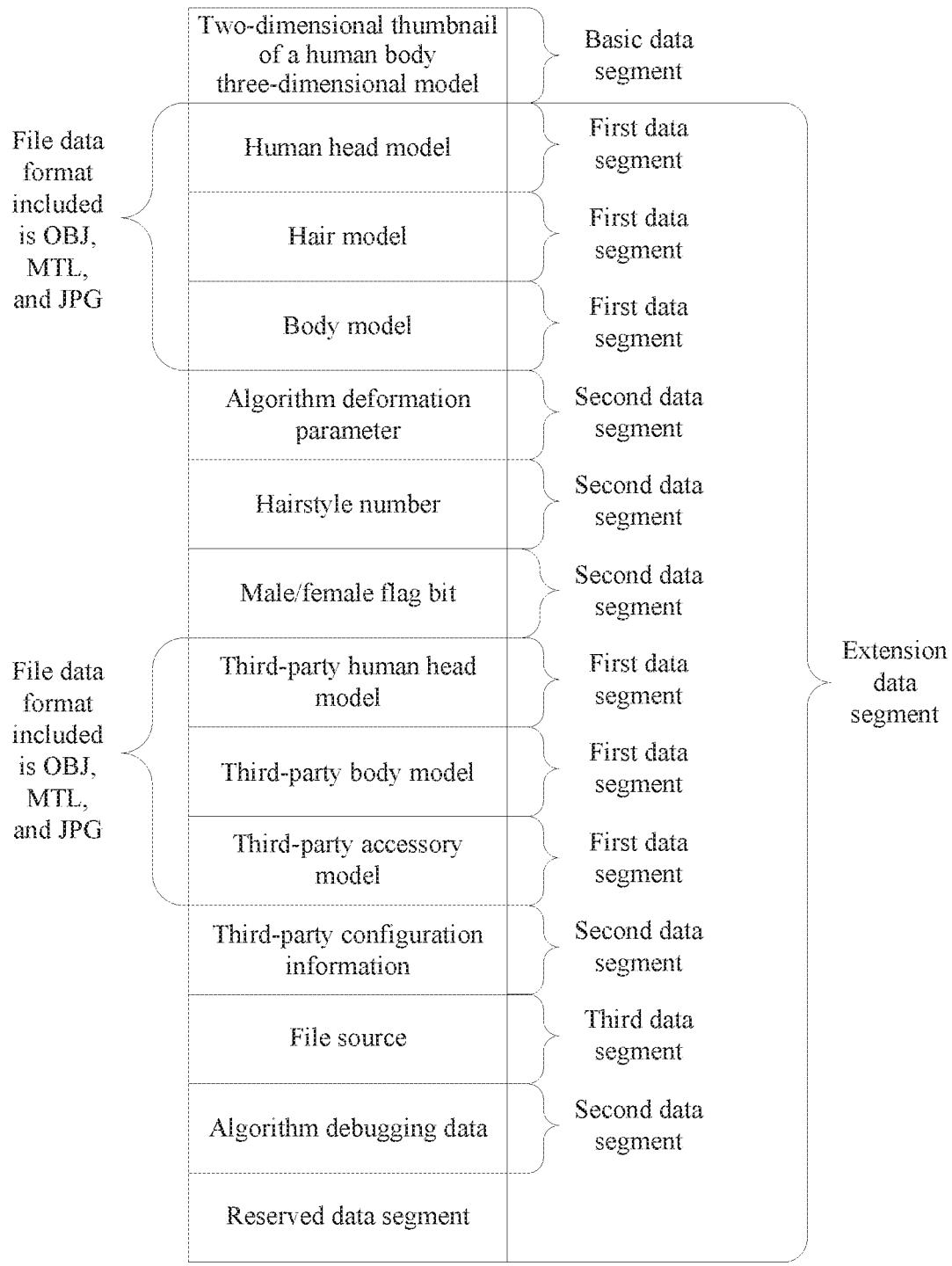
FIG. 6 is a schematic diagram of a first file used for storing human body three-dimensional model information according to an embodiment of the present invention.

FIG. 6 is a schematic diagram of a first file used for storing human body three-dimensional model information according to an embodiment of the present invention.

As shown in FIG. 6, the first data segment of the first file is a basic data segment used for storing two-dimensional image information of a human body three-dimensional model. A terminal device may generate a thumbnail of the human body three-dimensional model based on the two-dimensional image information of the human body three-dimensional model. The thumbnail may be a thumbnail in a JPEG format, and the size of the thumbnail is not limited. The thumbnail may be a thumbnail of a front picture of the human body three-dimensional model, or may be a thumbnail of a view picture of any side that can represent a main characteristic of the human body three-dimensional model.

It should be understood that the thumbnail may further be a thumbnail in another picture format, for example, may be a thumbnail in a PNG format, a thumbnail in a BMP format, or the like. This embodiment of the present invention is not limited thereto.

A second data segment of the first file is used for storing human head model information of the human body three-dimensional model, and a data segment that is stored in the human head model is a first data segment in an extension data segment of the first file. File types of a plurality of files that are required for generating the human head model may separately be an OBJ format, an MTL format, and a JPEG format, and there may be more than one file in the JPEG format.

Similarly, hair model information is stored behind the human head model information. A data segment storing hair model information is another first data segment in the extension data segment. File types of a plurality of files that are required for generating the hair model may also separately be an OBJ format, an MTL format, and a JPEG format, and there may be more than one file in the JPEG format.

Body model information is stored behind the hair model information. A data segment stored in body model information is another first data segment in the extension data segment. File types of a plurality of files that are required for generating the body model may also separately be an OBJ format, an MTL format, and a JPEG format, and there may be more than one file in the JPEG format.

It should be understood that in this embodiment of the present invention, that file types of a plurality of files that are required for generating a part are an OBJ format, an MTL format, and a JPEG format are merely used as an example to describe the file types of the plurality of files that are required for generating the three-dimensional model. This embodiment of the present invention is not limited thereto.

An algorithm deformation parameter is stored behind the body model information. The algorithm deformation parameter is stored in a second data segment of the extension data segment of the first file, the algorithm deformation parameter is an optional parameter for generating the human body three-dimensional model, and a data type of the algorithm deformation parameter is a binary format.

Hairstyle number information is stored behind the algorithm deformation parameter. The hairstyle number information is stored in another second data segment of the extension data segment, and the hairstyle number may also be an optional parameter for generating the human body three-dimensional model.

Behind the hairstyle number, there is a male or female flag bit for storing male or female flag information, the male or female flag information is stored in another second data segment of the extension data segment, and the male or female flag information is an optional parameter for generating the human body three-dimensional model.

Third-party human head model information is stored behind the male or female flag bit. The third-party human head model information is stored in another first data segment in the extension data segment. File types of a plurality of files that are required for generating the human head model may separately be the OBJ format, the MTL format, and the JPEG format, and there may be more than one file in the JPEG format.

Similarly, third-party body model information is stored behind the third-party human head model information, and the third-party body model information is stored in another first data segment in the extension data segment. File types of a plurality of files that are required for generating the body model may also separately be the OBJ format, the MTL format, and the JPEG format, and there may be more than one file in the JPEG format.

Third-party accessory model information is stored behind the third-party body model information, and the third-party accessory model information is stored in another first data segment in the extension data segment. File types of a plurality of files that are required for generating the accessory model may separately be the OBJ format, the MTL format, and the JPEG format, and there may be more than one file in the JPEG format.

It should be understood that in this embodiment of the present invention, that file types of a plurality of files that are required for generating a three-dimensional model are the OBJ format, the MTL format, and the JPEG format are merely used as an example to describe the file types of the plurality of files that are required for generating the three-dimensional model. This embodiment of the present invention is not limited thereto.

Third-party configuration information is stored behind the body model information. The third-party configuration information is stored in another second data segment in the extension data segment, and the third-party configuration information is an optional parameter for generating the human body three-dimensional model.

File source information is stored behind the third-party configuration information. The file source information is stored in a third data segment in the extension data segment, and the file source information is used for indicating a source of the first file that stores the human body three-dimensional model information.

Algorithm debugging data is stored behind the file source information. The algorithm debugging data is stored in another second data segment in the extension data segment, the algorithm debugging data is an optional parameter for generating the human body three-dimensional model, and data type of the algorithm debugging data is a binary format.

A reserved data segment is behind the algorithm debugging data. The reserved data segment is used for storing follow-up extension data, or may be a first data segment of the extension data segment, or may be a second data segment of the extension data segment. For example, the follow-up extension data may be used for storing skeleton data, may be used for storing other model information or parameters, or may be used for storing a relevant parameter of the third-party configuration information.

It should be understood that an arrangement order, shown in FIG. 6, of each data segment in the first file that stores human body three-dimensional model information is not an actual order. The arrangement order is merely used as an example in this embodiment of the present invention to describe each data segment in the first file. This embodiment of the present invention is not limited thereto.

Optionally, in some embodiments, one first file may include a plurality of pieces of same-type model information. For example, the first file shown in FIG. 6 may include a human head model and a third-party human head. The terminal device selects to read the human head model or the third-party human head based on a segment type of a header field in the data segment of the human head model and the third-party human head model, so that no confusion is caused when the terminal device reads the information.

It should be understood that in this embodiment of the present invention, the data segment included in the first file, shown in FIG. 6, is merely used as an example to describe the first file in a picture format. This embodiment of the present invention is not limited thereto. The first file in the picture format may further include more or less data segments.

The foregoing describes in detail the method embodiments in the embodiments of the present invention with reference to FIG. 2 to FIG. 6. The following describes in detail an embodiment of a terminal device in embodiments of the present invention with reference to FIG. 7 and FIG. 8. It should be understood that the terminal device embodiment is corresponding to the method embodiment: for similar descriptions, refer to the method embodiments.

Figure 7:
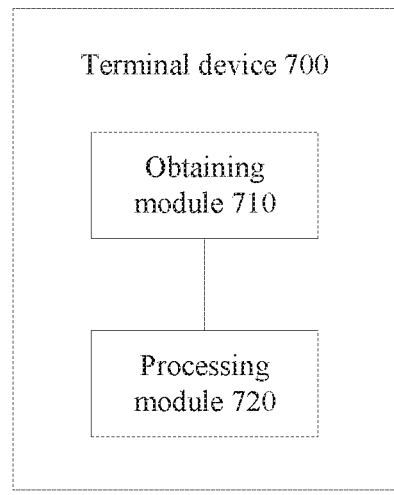
FIG. 7 is a schematic block diagram of a terminal device according to an embodiment of the present invention.

FIG. 7 is a schematic block diagram of a terminal device 700 according to an embodiment of the present invention. As shown in FIG. 7, the terminal device 700 includes:

an obtaining module 710, configured to obtain a first file in a picture format, where an extension data segment of the first file includes at least one first data segment, and the first data segment includes file data of a plurality of files that are required for generating a first three-dimensional model of the three-dimensional model, where the obtaining module 710 is further configured to obtain the file data of the plurality of files from the first data segment; and a processing module 720, configured to generate the first three-dimensional model based on the file data of the plurality of files.

It should be understood that the first three-dimensional model may be the entire three-dimensional model, or may be a part of the three-dimensional model.

Optionally, in some embodiments, a file format of the first file may be a JPEG format.

It should be understood that the first file may be a file in any picture format. In this embodiment of the present invention, that the first file is the JPEG format file is merely used as an example. This embodiment of the present invention is not limited thereto.

Optionally, in some embodiments, the first file further includes a basic data segment, and the basic data segment includes two-dimensional image information of the three-dimensional model.

Optionally, in some embodiments, the obtaining module 710 is further configured to obtain the two-dimensional image information from the basic data segment.

Optionally, in some embodiments, the processing module 720 is further configured to generate a thumbnail of the three-dimensional model based on the two-dimensional image information.

In this embodiment of the present invention, one file includes the file data of the plurality of files that are required for generating the three-dimensional model. This avoids that the plurality of files are required for describing the three-dimensional model, ensures accuracy of parsed data information of the three-dimensional model, and facilitates management of the file including the three-dimensional model data information by the terminal device.

Optionally, in some embodiments, the extension data segment further includes a second data segment, and the second data segment includes an optional parameter for generating the three-dimensional model.

In this embodiment of the present invention, with the optional parameter that is included in the second data segment, the three-dimensional model may be better and may look more realistic visually.

Optionally, in some embodiments, the first data segment includes a header field and a data field, the header field is mainly used for indicating a location, at the first data segment, of file data of each of the plurality of files that are required for generating the first three-dimensional model, and the first three-dimensional model may be the entire three-dimensional model, or may be a part of the three-dimensional model.

Optionally, in some embodiments, the header field is further used for indicating a type of the first data segment.

Optionally, in some embodiments, the header field is further used for indicating a length of the first data segment.

Optionally, in some embodiments, the header field is further used for indicating a file name or number of each of the plurality of files.

Optionally, in some embodiments, the header field is further used for indicating a file name or number length of each of the plurality of files.

Optionally, in some embodiments, the header field is further used for indicating a quantity of the plurality of files.

Optionally, in some embodiments, the extension data segment further includes a third data segment, and the third data segment is used for indicating a file source of the first file.

Optionally, in some embodiments, the third data segment is further used for indicating a type of a first file. Whether the first file is a file including three-dimensional model information can be determined by a terminal device based on a type indication of the first file, to distinguish the first file from a general picture format file.

Optionally, in some embodiments, the third data segment is further used for indicating a quantity of the first data segments and a quantity of the second data segments that are included in the first file. Theoretically, a value range of the quantity may be 0 to 255.

Optionally, in some embodiments, the third data segment is further used for indicating a location of the first data segment or the second data segment at the first file, this is, the third data segment includes a segment offset of the first data segment and a segment offset of the second data segment.

It should be understood that the terminal device 700 according to this embodiment of the present invention may correspond to the terminal device in the embodiments of the present invention. In addition, the foregoing and other operations and/or functions of modules in the terminal device 700 are intended to implement corresponding processes of the method in FIG. 2. For brevity, details are not described herein again.

Figure 8:
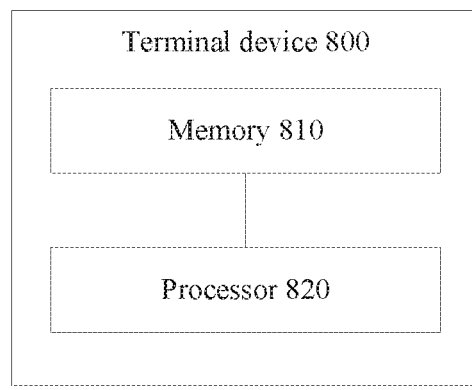
FIG. 8 is another schematic block diagram of a terminal device according to an embodiment of the present invention.

FIG. 8 is a schematic structural diagram of a terminal device 800 according to an embodiment of the present invention.

As shown in FIG. 8, the terminal device 800 includes a memory 810 and a processor 820, and the memory 810 and the processor 820 mutually communicate by using an internal connection channel to transfer a control signal and/or a data signal.

The memory 810 is configured to store program code.

The processor 820 is configured to invoke the program code to implement methods in the foregoing embodiments of the present invention.

In this embodiment of the present invention, the processor 820 may be a central processing unit (Central Processing Unit, CPU), a network processor (Network Processor, NP), or a combination of the CPU and the NP. The processor may further include a hardware chip. The hardware chip may be an application-specific integrated circuit (application-specific integrated circuit, ASIC), a programmable logic device (programmable logic device, PLD), or a combination thereof.

An embodiment of the present invention provides a computer-readable storage medium for storing computer program code, and the computer program includes an instruction used for executing a method for generating a three-dimensional model in the embodiment of the present invention shown in FIG. 2. The readable medium may be a read-only memory (Read-Only Memory, ROM) or a random access memory (Random Access Memory, RAM). This embodiment of the present invention is not limited thereto.

All or some of the foregoing embodiments of the present invention may be implemented by using software, hardware, firmware, or any combination thereof. When the software is used to implement the embodiments, the embodiments may be implemented entirely or partially in a form of a computer program product. The computer program product includes one or more computer instructions. The computer program instructions are loaded and executed on a computer completely or partially based on the processes or functions in the embodiments of the present invention. The computer may be a general-purpose computer, a dedicated computer, a computer network, or another programmable apparatus. The computer instructions may be stored in a computer-readable medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (Digital Subscriber Line, DSL)) or wireless (for example, infrared, radio, or microwave) manner. The computer-readable storage medium may be any usable medium accessible to a computer, or a data storage device, such as a server or a data center, integrating one or more usable media. The usable medium may be a magnetic medium (for example, a floppy disk, a hard disk, or a magnetic tape), an optical medium (for example, a digital video disc (Digital Video Disc, DVD)), a semiconductor medium (for example, a solid state disk (Solid State Disk, SSD)), or the like.

It should be understood that the terminal device 800 according to this embodiment of the present invention may correspond to the terminal device in the embodiments of the present invention. In addition, the foregoing and other operations and/or functions of components in the terminal device 800 are intended to implement corresponding processes of the method in FIG. 2. For brevity, details are not described herein again.

It should be understood that in this specification, a term "and/or" is only an associative relationship for describing associated objects, indicating that three relationships may exist, for example, A and/or B, which may indicate three situations: A exists independently; A and B exist simultaneously; and B exists independently. In addition, the character "/" in this specification generally indicates an "or" relationship between the associated objects.

A person of ordinary skill in the art may be aware that, in combination with the examples described in the embodiments disclosed in this specification, units and algorithm steps may be implemented by electronic hardware or a combination of computer software and electronic hardware. Whether the functions are performed by hardware or software depends on particular applications and design constraints of the technical solutions. A person skilled in the art may use different methods to implement the described functions for each particular application, but it should not be considered that the implementation goes beyond the scope of this application.

In the several embodiments provided in this application, it should be understood that the disclosed system, apparatus, and method may be implemented in other manners. For example, the described apparatus embodiment is merely an example. For example, the unit division is merely logical function division and may be other division in actual implementation. For example, a plurality of units or components may be combined or integrated into another system, or some features may be ignored or may not be performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, may be located in one location, or may be distributed on a plurality of network units. Some or all of the units may be selected according to actual requirements to achieve the objectives of the solutions of the embodiments.

In addition, functional units in the embodiments of this application may be integrated into one processing unit, or each of the units may exist alone physically, or two or more units are integrated into one unit.

The foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A method, comprising:
obtaining a first file, the first file being of a two-dimensional picture format, wherein the first file comprises a basic data segment and an extension data segment, wherein the basic data segment comprises two-dimensional image information of a second three-dimensional model, wherein the extension data segment comprises at least one first data segment, and wherein the at least one first data segment comprises file data of a plurality of files for generating a first three-dimensional model of the second three-dimensional model, wherein the at least one first data segment further comprises a header field and a data field, wherein the header field includes a segment type field, a segment length field, a name length field, a name/number field, a file quantity field, and a file offset field for each of the plurality of files indicating a corresponding location of each of the plurality of files, and wherein the data field stores the file data of the files, and wherein the extension data segment further comprises at least one second data segment including an optional parameter that is used for generating the first three-dimensional model and which is based on the first three-dimensional model;
obtaining the file data of the files from the at least one first data segment; and
generating the first three-dimensional model based on the file data of the files.

2. The method of claim 1, further comprising:
obtaining the two-dimensional image information from the basic data segment; and
generating a thumbnail of the first three-dimensional model based on the two-dimensional image information.

3. The method of claim 1, wherein the extension data segment further comprises at least one third data segment, and wherein the at least one third data segment indicates a source of the first file.

4. The method of claim 1, wherein a file format of the first file is a Joint Photographic Experts Group (JPEG) format.

5. The method of claim 1, wherein a file format of the first file is a portable network graphics (PNG) format.

6. A terminal device, comprising:
a receiver configured to:
obtain a first file, the first file being of a two-dimensional picture format, wherein an extension data segment of the first file comprises at least one first data segment, and wherein at least one first data segment of the first file comprises file data of a plurality of files for generating a second three-dimensional model of a first three-dimensional model, wherein the at least one first data segment further comprises a header field and a data field, wherein the header field includes a segment type field, a segment length field, a name length field, a name/number field, a file quantity field, and a file offset field for each of the plurality of files indicating a corresponding location of each of the plurality of files, and wherein the data field stores the file data of the files, and wherein the extension data segment further comprises at least one second data segment including an optional parameter that is used for generating the first three-dimensional model and which is based on the first three-dimensional model; and
obtain the file data of the files from the at least one first data segment; and
a processor coupled to the receiver and configured to generate the second three-dimensional model based on the file data of the files.

7. The terminal device of claim 6, wherein the first file further comprises a basic data segment, wherein the basic data segment comprises two-dimensional image information of the first three-dimensional model, wherein the receiver is further configured to obtain the two-dimensional image information from the basic data segment, and wherein the processor is further configured to generate a thumbnail of the first three-dimensional model based on the two-dimensional image information.

8. The terminal device of claim 6, wherein the extension data segment further comprises a third data segment, and wherein the third data segment indicates a source of the first file.

9. The terminal device of claim 6, wherein a file format of the first file is a Joint Photographic Experts Group (JPEG) format.

10. The terminal device of claim 6, wherein a file format of the first file is a portable network graphics (PNG) format.

11. A terminal device, comprising:
a memory configured to store a program code; and
a processor coupled to the memory, wherein the program code causes the processor to be configured to:
obtain a first file, the first file being of a two-dimensional picture format, wherein an extension data segment of the first file comprises at least one first data segment, and wherein at least one first data segment of the first file comprises file data of a plurality of files for generating a second three-dimensional model of a first three-dimensional model, wherein the at least one first data segment further comprises a header field and a data field, wherein the header field includes a segment type field, a segment length field, a name length field, a name/number field, a file quantity field, and a file offset field for each of the plurality of files indicating a corresponding location of each of the plurality of files, and wherein the data field stores the file data of the files, and wherein the extension data segment further comprises at least one second data segment including an optional parameter that is used for generating the first three-dimensional model and which is based on the first three-dimensional model;

obtain the file data of the files from the at least one first data segment; and generate the second three-dimensional model based on the file data of the files.

12. The terminal device of claim 11, wherein the first file further comprises a basic data segment, wherein the basic data segment comprises two-dimensional image information of the first three-dimensional model, and wherein the program code further causes the processor to be configured to:

obtain the two-dimensional image information from the basic data segment; and generate a thumbnail of the first three-dimensional model based on the two-dimensional image information.

13. The terminal device of claim 11, wherein the extension data segment further comprises a third data segment, and wherein the third data segment indicates a source of the first file.

14. The terminal device of claim 11, wherein a file format of the first file is a Joint Photographic Experts Group (JPEG) format.

* * * * *